UNITED STATES PATENT OFFICE.

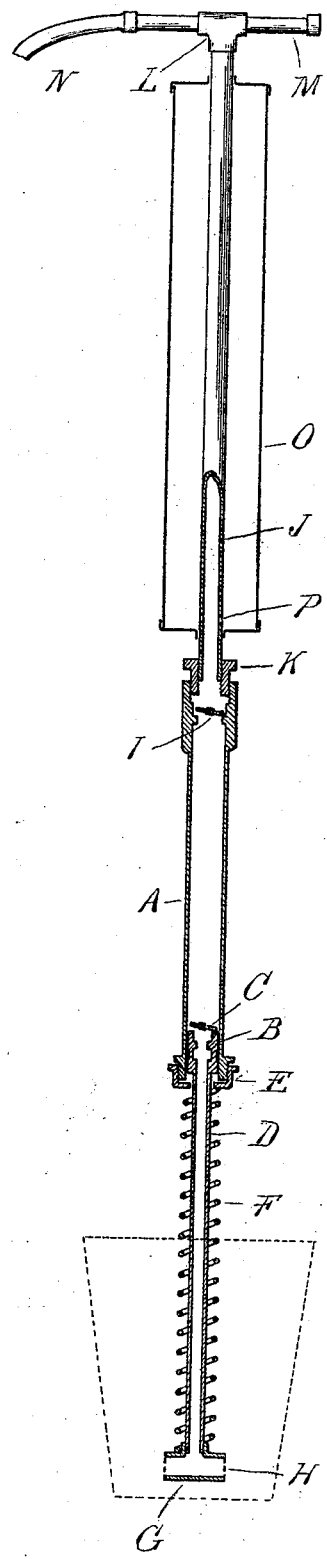

JOHN CLARK, OF PONTIAC, MICHIGAN.

HAND-PUMP.

SPECIFICATION forming part of Letters Patent No. 519,444, dated May 8, 1894.

Application filed January 17, 1893. Serial No. 458,643. (No model.)

*To all whom it may concern:*

Be it known that I, JOHN CLARK, a citizen of the United States, residing at Pontiac, in the county of Oakland and State of Michigan, have invented certain new and useful Improvements in Hand-Pumps, of which the following is a specification, reference being had therein to the accompanying drawings.

The invention consists in the peculiar construction, arrangement and combination of the various parts, all as more fully hereinafter described.

In the drawings, I have shown a pump in vertical, central, longitudinal section.
My pump is especially designed for use as a hand pump for pumping out bilge water, for distributing liquid poison, for watering lawns, or it may be used as an air pump to force air into portable liquid holding tanks, the air being used to force the liquid as in fire extinguishers, &c., and for all similar or analogous uses.

A is the pump cylinder.

B is the piston head, having suitable packing and provided with the usual valve C.

D is the piston rod which is tubular and forms the suction pipe for the pump and extends downward from the piston outside of the cylinder A. The piston is held in the cylinder by means of a collar E which is suitably apertured to allow the piston rod D to pass therethrough.

F is a spring preferably of spiral form, sleeved about the piston rod D, bearing with its upper end against the collar E, and at its lower end on a suitable bearing on the lower end of the piston rod. I preferably form this bearing in the shape of a T—G. The ends of the T open laterally and are provided preferably with suitable screens H.

I is a valve at the upper end of the cylinder and J is the discharge pipe which is preferably secured in a reducing nipple K at the upper end of the cylinder. The discharge pipe at its upper end preferably terminates in a T—L—, in which is secured the transverse discharge pipe M, extending on both sides of the T, capped at one end and preferably provided with a suitable hose N at the other end, this cross-head forming a handle, by means of which the device may be operated. Between the cross-head and the cylinder and surrounding the discharge pipe J is a cylindrical casing O, which forms the air chamber of my pump. The discharge pipe is provided within this cylinder, preferably near the lower end thereof, with apertures P, by means of which communication is established between the discharge pipe and the air cylinder.

The parts being thus constructed, their operation is as follows: If water is to be pumped the operator places the lower end of the suction pipe in the receptacle in which the water is contained, and then taking hold of the cross-head M he presses down upon the pump when the cylinder A, will move down over the piston B, compressing the spring F, the valves C and I opening, and forcing the air in the cylinder out through the discharge pipe M; releasing the pressure on the pump, the spring F will force the cylinder A upward, the valve I closing, will draw the water from the receptacle into that cylinder, the valve C opening to allow the ingress of the water. Continuation of this downward pressure and relief of the same will cause the water to rise in the discharge pipe and be forced out through the cross-head and hose, by which it may be directed to any desired point. The water as it rises under pressure in the discharge pipe J will enter the air chamber O through the apertures P and the pressure of the water therein will cause a steady stream to fall from the discharge end of the hose.

In pumps of this kind heretofore it has been necessary to either fasten the pump to the pail or other receptacle, or else to have some means of holding down the pump while being operated. With my device, employing the spring F to lift the pump, I force the water from the discharge pipe by the downward motion of the cylinder upon the piston which remains stationary.

My pump may be employed to pump fluid from a receptacle while standing at any angle, so long as an abutment can be had against which to force the end of the piston rod D.

What I claim as my invention is—

1. In a pump, the combination with a cylinder, of a tubular piston rod working in the cylinder and projecting below the same, a spring sleeved on the outside of the rod and outside of the cylinder, a valved piston mounted directly on the upper end of the rod within the cylinder, a tubular discharge extension connected directly to the upper end of the cylinder, a hollow handle on the extension and a discharge pipe leading from the handle, substantially as described.

2. In a pump, the combination with a cylinder, of a tubular piston rod working on the cylinder and projecting below the same, a spring sleeved on the rod outside the cylinder, a projection on the rod with which the spring engages, a valved piston head fixed on the upper end of the rod and a discharge extension rigid on and forming a direct continuation of the cylinder, substantially as described.

3. In a pump, the combination with a cylinder, of a tubular piston rod working therein, having a lateral projection on its lower end, a valved piston fixed on the upper end of the rod, a spring sleeved on the rod outside the cylinder, its ends abutting against the lower end of the cylinder and extension on the piston, a discharge extension rigidly united directly on the cylinder and an air drum surrounding the extension and secured at the top and bottom thereto, substantially as described.

4. In a pump, the combination with a cylinder having an air chamber, discharge and handle thereon, of a tubular piston rod of smaller diameter than the cylinder and working therein, a valved piston on the upper end of the rod, a lateral projection on the lower end of the rod, a collar E on the lower end of the cylinder, and a spiral spring surrounding the outside of the rod having its upper end abutting against the collar and its lower end against the projection, substantially as described.

In testimony whereof I affix my signature in presence of two witnesses.

JOHN CLARK.

Witnesses:
M. B. O'DOGHERTY,
N. L. LINDOP.